United States Patent Office 2,825,571
Patented Mar. 4, 1958

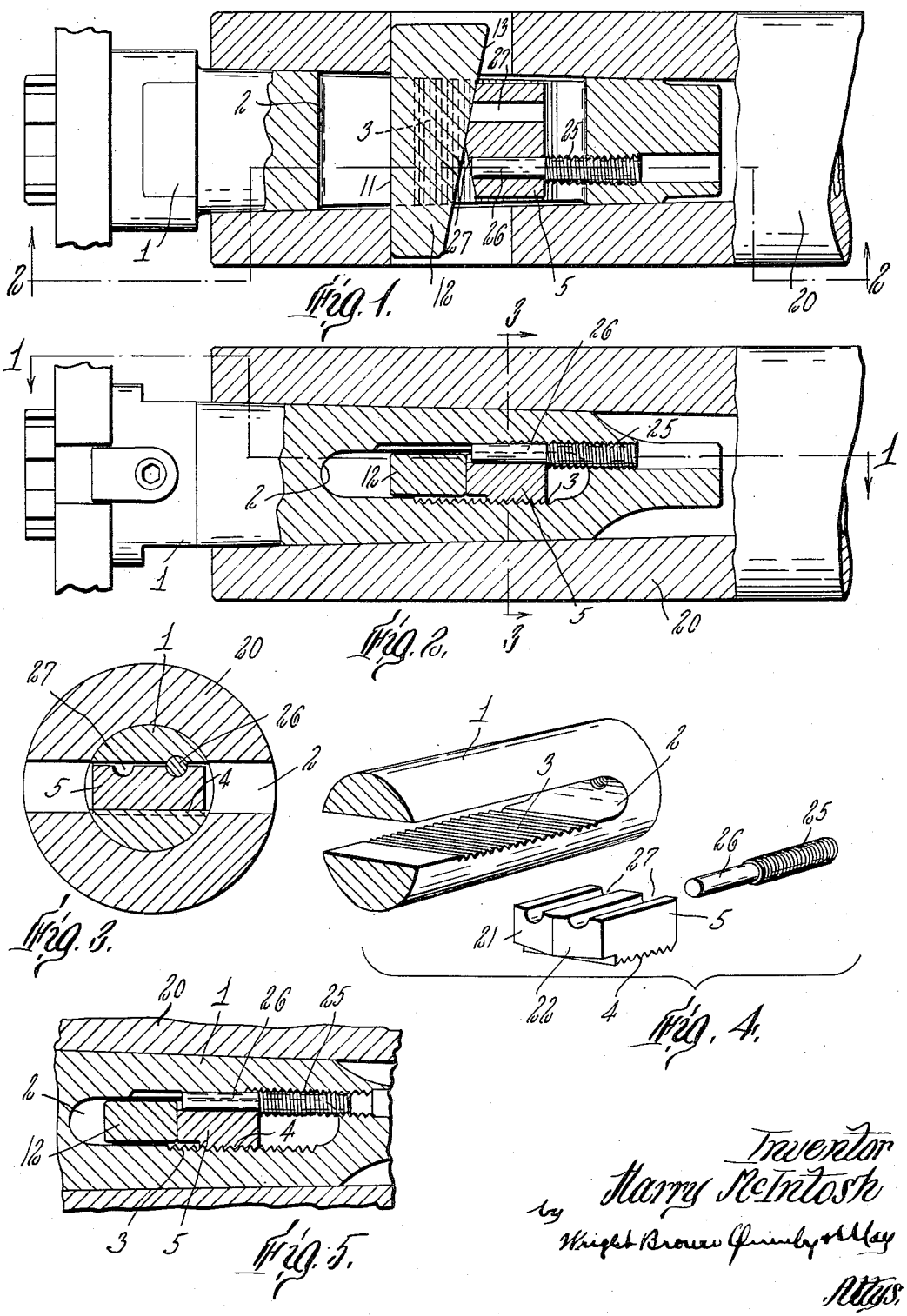

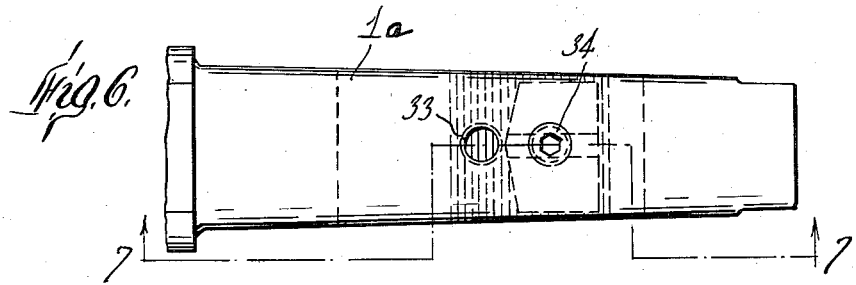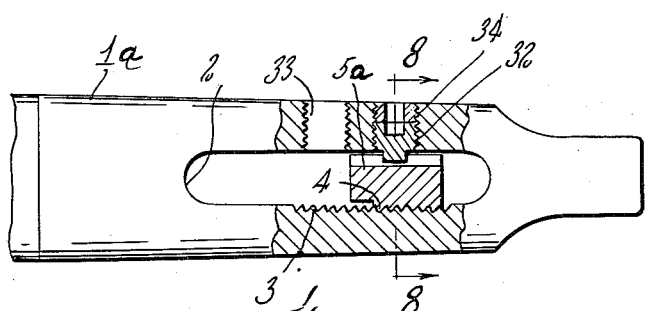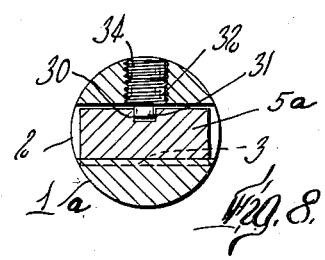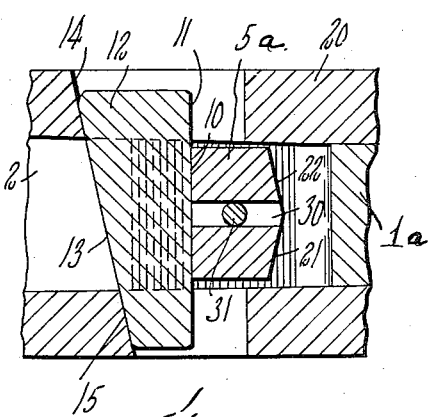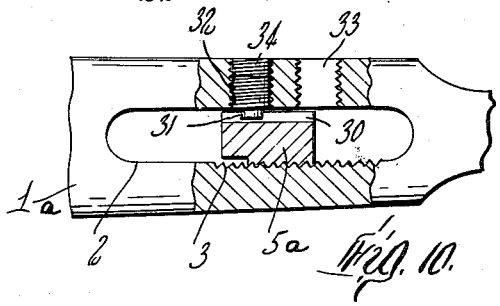

2,825,571

MORSE TAPER ARBORS

Harry McIntosh, Townshend, Vt., assignor to Lovejoy Tool Company, Inc., Springfield, Vt., a corporation of Vermont Application June 21, 1955, Serial No. 516,984

9 Claims. (Cl. 279—97)

Power tools such as drills, reamers, milling cutters, and the like, are commonly provided with tapered arbors adapted to be held in reversely tapered socket members and be retained therein by wedges extending laterally through the socket members and arbors. While the extent of taper of such arbors and sockets is designated by standard numbers, there is great variance in the length and position of the slots of the socket members, and to allow for this it has been a practice to provide a multiplicity of blocks of different lengths selectively positionable in the arbor slots and against which a securing wedge bears so that the securing wedge may be effective to hold the tool in position in the various machine sockets. Also, it was taken care of by having each arbor slotted specifically for each machine spindle. In other words, the arbor would be only good for, or fit, the one machine for which it was made.

This invention has for an object to provide a single block adjustable in the arbor slot to suit the position of the socket slot, thus to facilitate the securement of the arbor in a desired socket without requiring a multiplicity of blocks of different sizes to insure that this may be done, or without making a separate arbor or taper shank tool for each requirement.

A further object is to provide means for securing the block in adjusted position without the risk of change in the taper of the arbor.

In some machines one and in other the opposite face of the wedge must engage the block. A further feature of this invention, therefore, is to provide for selective endwise positioning of the block with either a face perpendicular to the axis of the arbor or a face inclined to the perpendicular facing the wedge, depending upon the design of the socket members.

For a complete understanding of this invention, reference may be had to the accompanying drawings in which Figure 1 is a fragmentary view partly broken away and in section of a tapered tool shank assembled in a taper machine socket, and embodying the invention.

Figure 2 is a detail sectional view on line 2—2 of Figure 1.

Figure 3 is a sectional view on line 3—3 of Figure 2.

Figure 4 is an exploded perspective view of certain of the parts shown in Figures 1 to 3, inclusive.

Figure 5 is a view similar to a portion of Figure 2, but showing the wedge-engaging block in a different position.

Figure 6 is a side elevation of a tool shank showing a modified construction.

Figure 7 is a detail sectional view on line 7—7 of Figure 6.

Figure 8 is a detail sectional view on line 8—8 of Figure 7.

Figure 9 is an exploded perspective view of certain of the parts shown in Figure 8.

Figure 10 is a view similar to Figure 7, but showing the block in a different position.

Figure 11 is a fragmentary sectional view somewhat similar to a portion of Figure 6, but showing the wedge block reversed end for end for engaging with the perpendicular face of the wedge.

Referring first to Figure 1, at 1 is indicated a tapered shank of a tool of any desired description which is to be rotated in use. This shank portion 1 is provided with a longitudinal slot 2 therethrough as shown in Figure 2. At one end of this slot the wall of the arbor is shown as provided with serrations at 3 with which may engage mating serrations 4 on a block 5 which lies within the slot 2 as shown in Figures 2 and 5. This block 5 may be moved into and out of position within the slot laterally thereof and into any selected of a plurality of positions lengthwise of the arbor. Thus as shown in Figure 2, the block is arranged toward the smaller diameter end of the arbor, while in Figure 5 it is arranged substantially centrally of the slot 2.

As shown best in Figure 11, the block 5 may have one end 10 arranged perpendicular to the lengthwise axis of the arbor when the block is arranged in position, this face being engageable with the correspondingly perpendicular face 11 of the securing wedge 12 in the position of Figure 11. The inclined face 13 of such a wedge may engage one of mating inclined faces 21 or 22 of the socket 20 within the slot 2 of the arbor, held as shown in Figure 1. The other end of the block 5 is shown in Figures 1, 4, 9 and 11 as provided with two relatively inclined faces 21 and 22 which are arranged to match the non-perpendicular side 13 of the wedge 12. Depending upon the nature of the slot 2 through the arbor and the corresponding slot through the socket member, the wedge 13 may be formed to engage either one or the other end of the block 5. It will be noted that the serrations 3 are arranged laterally of the axis of the slot and likewise the engaging portions 4 of the block are similarly arranged so that the block may be slid into position from either side of the arbor into position between the side walls of the arbor.

Means are provided for securing the block in any adjusted position, but such means should be of a character which will impart no stress on the arbor such as might tend to change its taper. As shown best in Figures 1 and 2, such means may comprise a threaded member 25 arranged to be threaded into the arbor member substantially lengthwise thereof and having a reduced diameter inner end 26 which may be engaged in either of a pair of surface grooves 27 in the face of the block 5 opposite to the face 4 which engages the serrated surface of the arbor slot. With this arrangement the block 5 may be held in position without imparting any stresses on the arbor such as would tend to change its taper. A pair of threaded members 25 having portions 26 of different lengths may be employed at different times, the one to engage one of the grooves 27 when the block 5 is adjacent to the smaller end of the arbor, and the other to engage in the other groove when the block is further therefrom as shown in Figure 5.

Another method of securing the block 5a in position is illustrated in Figures 6 to 10 in which the block is provided with one surface channel 30 within which may engage the reduced diameter extremity 31 of a set screw 32 which is threaded into either of a plurality of threaded holes 33 through the arbor 1a. The portion 31 engages groove 30 and prevents lateral disengagement of the block 5 from within the slot, and a lock screw 34 bearing on the outer end of the screw 32 acts to lock the screw 32 against turning but without imparting any lateral thrust to the arbor.

As shown in Figures 6, 7 and 10, there may be a pair of these threaded holes 33 into either of which the set screws 32 and 34 may be positioned, depending upon the axial position of the block 5a, as shown in Figures 7 and 10. It will be noted that these set screws are arranged laterally of the direction of the axis of the arbor, while the means 25 shown in Figures 1 to 5 are arranged longitudinally thereof, but in neither case does the locking means produce any stresses on the arbor tending to vary the taper thereof.

From the foregoing description of certain embodiments of the invention it will be evident to those skilled in the art that various changes and modifications may be made therein without departing from its spirit or scope.

I claim:

1. A tool having a tapered arbor provided with a slot longitudinally therethrough, a block of less length than said slot adapted to be positioned within said slot, and means for securing said block within said slot at any selected of a plurality of positions lengthwise of said slot.

2. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, and means actuable to secure said block in lengthwise adjusted position within said slot.

3. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, and means carried by said arbor and engaging said block for securing said block in any of said positions.

4. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, said block having a recess in another of its faces, and means carried by said arbor and engaging in said recess for securing said block in any of said positions.

5. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, said block having a recess in another of its faces, and means carried by said arbor and adjustable laterally of said slot and engaging in said recess for securing said block in any of said positions.

6. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, said block having a recess in another of its faces, and means carried by said arbor and adjustable longitudinally of said slot and engaging in said recess for securing said block in any of said positions.

7. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, said block having a recess in another of its faces, and means carried by said arbor and threaded laterally of said slot and engaging in said recess for securing said block in any of said positions.

8. A tool having a tapered arbor provided with a slot longitudinally therethrough, a block of less length than said slot adapted to be positioned within said slot, one face of said block and said arbor along one side of said slot having interengaging parts permitting assembly of said block within said slot at any of a plurality of selected positions of said block lengthwise within said slot, said block having a recess in another of its faces, and means carried by said arbor threaded longitudinally of said slot and engaging in said recess for securing said block in any of said positions.

9. A tool having a tapered arbor provided with a slot longitudinally therethrough and a block of less length than said slot adapted to be positioned within said slot, said block having one end perpendicular to the length of said slot and its opposite end inclined thereto, and means for securing said block in said slot in any of a plurality of endwise positions with either selected end thereof toward the large end of said taper.

References Cited in the file of this patent

UNITED STATES PATENTS

| | | |
|---|---|---|
| 647,020 | Muller | Apr. 10, 1900 |
| 794,039 | Nelson | July 4, 1905 |
| 1,037,091 | Wedge | Aug. 27, 1912 |